United States Patent
Amir

(10) Patent No.: US 9,212,544 B2
(45) Date of Patent: Dec. 15, 2015

(54) APPARATUS AND METHOD FOR PREVENTING DAMAGE TO A DOWNHOLE PUMP IMPELLER

(75) Inventor: Nadav Amir, Rehovot (IL)

(73) Assignee: Ormat Technologies Inc., Reno, NV (US)

( * ) Notice: Subject to any disclaimer, the term of this patent is extended or adjusted under 35 U.S.C. 154(b) by 840 days.

(21) Appl. No.: 13/368,874

(22) Filed: Feb. 8, 2012

(65) Prior Publication Data
US 2013/0199776 A1 Aug. 8, 2013

(51) Int. Cl.
  *E21B 43/12* (2006.01)
  *F04D 13/10* (2006.01)
  *F04D 29/042* (2006.01)

(52) U.S. Cl.
  CPC ........... *E21B 43/126* (2013.01); *F04D 13/10* (2013.01); *F04D 29/042* (2013.01)

(58) Field of Classification Search
  CPC . E21B 43/126; E21B 43/128; E21B 47/0007; F04D 29/042; F04D 13/10
  USPC ....................................... 415/901; 417/423.3
  See application file for complete search history.

(56) References Cited

U.S. PATENT DOCUMENTS

| | | | |
|---|---|---|---|
| 4,057,365 A * | 11/1977 | Colmer | 417/44.1 |
| 4,507,735 A | 3/1985 | Moorehead et al. | |
| 6,167,965 B1 | 1/2001 | Bearden et al. | |
| 7,347,261 B2 * | 3/2008 | Markel et al. | 166/255.1 |
| 2002/0066568 A1 * | 6/2002 | Buchanan et al. | 166/313 |
| 2006/0000605 A1 * | 1/2006 | Jordan et al. | 166/255.1 |
| 2008/0018334 A1 | 1/2008 | Reiderman | |
| 2009/0016899 A1 | 1/2009 | Davis | |
| 2009/0084546 A1 | 4/2009 | Ekseth et al. | |
| 2010/0326668 A1 | 12/2010 | Griffiths et al. | |

OTHER PUBLICATIONS

International Search Report issued May 31, 2013, in PCT/IB13/00156.

* cited by examiner

*Primary Examiner* — Jennifer H Gay
*Assistant Examiner* — George Gray
(74) *Attorney, Agent, or Firm* — Oblon, McClelland, Maier & Neustadt, L.L.P.

(57) ABSTRACT

A method for preventing damage to a downhole pump impeller of a downhole pump includes setting a rotatable part of a downhole pump to a selected depth, monitoring the depth of the rotatable part, determining that the depth of the rotatable part has significantly changed, and taking a corrective action to return the depth of the rotatable part to said selected depth in order to prevent damage to an impeller that is liable to be caused by a change in depth of the rotatable part. The downhole pump further has a line shaft, an impeller engaged with the line shaft for pressurizing fluid to be extracted from a well, and monitoring apparatus for monitoring the depth of a distal end of the line shaft in order to prevent damage to the impeller that is liable to be caused by a change in depth of the distal end.

9 Claims, 6 Drawing Sheets

A - A

APPARATUS AND METHOD FOR PREVENTING DAMAGE TO A DOWNHOLE PUMP IMPELLER

FIELD OF THE INVENTION

The present invention relates to the field of downhole pumps. More particularly, the invention relates to an apparatus and method for preventing damage to a downhole pump impeller such as a downhole pump impeller of a geothermal downhole pump.

BACKGROUND

A downhole pump is used to extract a natural resource such as oil, geothermal fluid, and potable water from a deep well. A typical downhole pump is a vertical turbine pump which has three main parts: the head assembly which comprises the motor for driving the pump, the shaft and column assembly, and the pump bowl assembly. The lower pump bowl assembly comprises the stationary bowl and the impeller for accelerating the flow of the fluid to be extracted, which rotates within the bowl. The shaft and column assembly provides the connection between the head assembly and the pump bowl assembly. The line shaft transmits torque from the pump motor to the impellers and rotates internally to the column. The extracted fluid is transported within the column to the surface.

Vertical turbine pumps have thrust loads acting parallel to the line shaft that include downward forces due to unbalanced pressure forces, downward forces due to the weight of the rotating parts, and upward forces due a change in momentum as a result of the flow though the impellers. The line shaft may be subjected to excessive upthrust forces when the pump is operated at very high flow rates which can lead to various mechanical problems such as deformation of the line shaft, bearing wear, and damage to the impellers by being rubbed against the bowls.

It would be desirable to provide data regarding the position of the impeller in order to determine whether it is liable to be damaged.

The present invention advantageously provides an apparatus and method for accurately measuring the position of a downhole pump impeller, in order to prevent damage thereto.

Other of the invention will become apparent as the description proceeds.

SUMMARY

The present invention provides a method for preventing damage to a downhole pump impeller of a downhole pump such as a geothermal downhole pump, comprising the steps of setting a rotatable part of a downhole pump to a selected depth, monitoring the depth of said rotatable part, determining that the depth of said rotatable part has significantly changed, and taking a corrective action to return the depth of said rotatable part to said selected depth in order to prevent damage to an impeller that is liable to be caused by a change in depth of said rotatable part.

The line shaft of a downhole pump is very long, for example on the order of 475 m when used in a geothermal production well, and is prone to deformation or is subject to excessive upthrust forces, which can lead to damage to the impeller.

In one embodiment, the depth of a line shaft distal end is monitored by aiming a beam of light emitted from a housing mounted on an outer portion of the downhole pump onto one of a plurality of reflective elements located on the line shaft distal end, and determining whether a receiver mounted on said outer portion receives light reflected from said plurality of reflective elements.

In other embodiments, an electromagnetic field applied to an electric coil, attached to the inner surface of the pump outer portion, having a variable core attached to the line shaft determines whether the inductivity of the coil changes, or oil is injected into a variable nozzle device to determine whether there is a change in oil pressure.

The present invention is also directed to a downhole pump such as a geothermal downhole pump, comprising a line shaft, an impeller engaged with said line shaft for pressurizing fluid to be extracted from a well, and monitoring apparatus for monitoring the depth of a distal end of said line shaft in order to prevent damage to said impeller that is liable to be caused by a change in depth of said distal end.

In one aspect, the pump further comprises a controller mountable in a head assembly for receiving a correct depth signal from the monitoring apparatus and for generating an alert signal if said correct depth signal ceases to be received.

In one aspect, the monitoring apparatus is operable only during rotation of the line shaft.

DETAILED DESCRIPTION

The present invention relates to an apparatus and method for accurately monitoring the position of a downhole pump impeller such as a geothermal downhole pump impeller relative to stationary components in order to determine whether the impeller is liable to be damaged.

Figure 1:
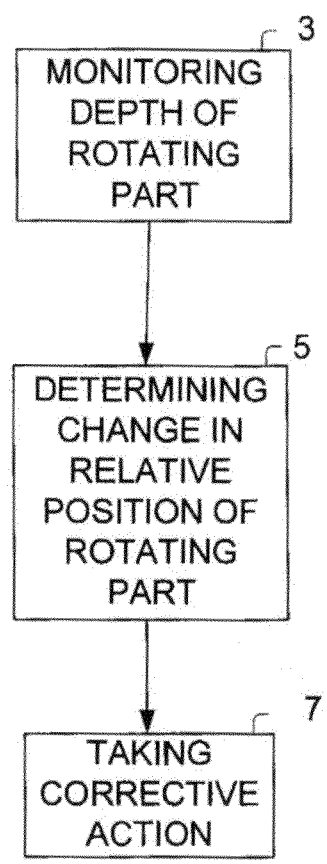
FIG. 1 illustrates a method for preventing damage to a downhole pump impeller, according to one embodiment of the invention.

Broadly speaking, as shown in FIG. 1, the method of the present invention includes the monitoring in step 3 of the depth of a rotating part, particularly the impeller. The determination of whether the position of the rotating part relative to a stationary part has changed is then made in step 5. If necessary, corrective action is taken in step 7 to prevent the rubbing of the rotating part against the stationary part of the downhole pump.

Figure 2:
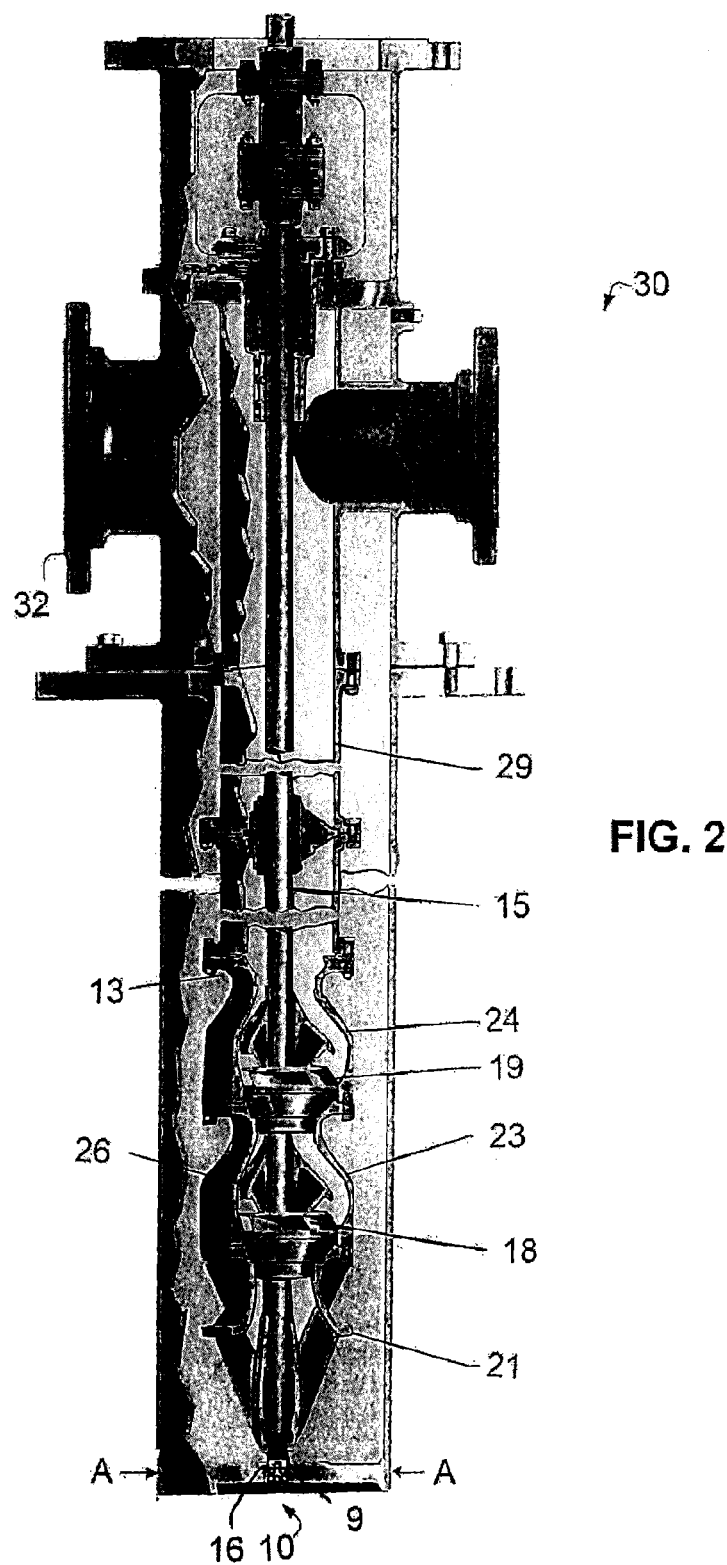
FIG. 2 is a vertical cross sectional view of a portion of a downhole pump, showing monitoring apparatus according to one embodiment of the invention.

FIG. 2 illustrates monitoring apparatus according to one embodiment of the present invention, and is designated as 10. Monitoring apparatus 10 is shown to be mounted on a vertical turbine pump 30 for use in geothermal applications, but it will be appreciated that it can also be suitably mounted on any other downhole pump and for any other application.

Vertically disposed line shaft 15 of pump 30, which transmits torque from the pump motor of the head assembly, is engaged with first stage impeller 18 and second stage impeller 19, or further impeller stages, and causes the same to rotate within the bowl assembly, which includes suction bell 21, intermediate bowl 23, and top bowl 24. During rotation of impellers 18 and 19, the momentum of the fluid to be extracted from the well in which pump 30 is disposed is increased, causing the fluid to rise through suction bell 21. Diffuser 26 located above each impeller converts the tangential flow of increased pressure diverging from impellers 18 and 19 to an axial flow rising within column 29. The extracted fluid may then be directed to be discharged transversally through elbow 32, a portion of which being shown. A tubular outer portion 13 surrounds the bowl assembly and column 29.

Monitoring apparatus 10 comprises a plurality of reflective elements 9, e.g. mirror elements, located on distal end 16, i.e. the lowermost portion, of line shaft 15.

Figure 3:
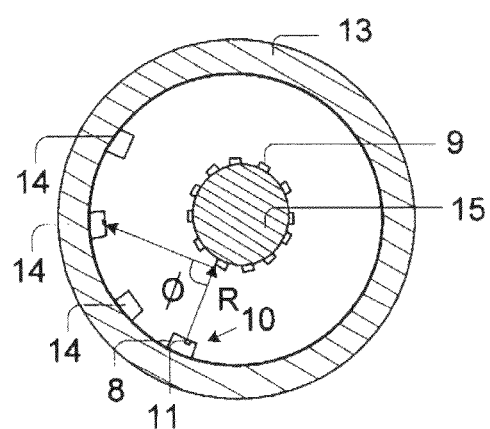
FIG. 3 is a horizontal cross section view of the pump of FIG. 2, cut about plane A-A.

As shown in FIG. 3, monitoring apparatus 10 also comprises a light emitter 8 and one or more receivers 14, which are secured to the inner surface of outer portion 13. During rotation of shaft 15, light beam R is emitted from light emitter 8 and is reflected by reflective elements 9 located on the outer surface of shaft 15. Light beam R is reflected by an angle 0 from the impinged element 9, depending on the rotational speed of shaft 15, onto receiver(s) 14. Emitter 8 generally comprises a lens 11, or any other suitable optical device, for focusing generated light in the form of beam R that is directed towards the reflective elements 9. Receivers 14 continue to receive the reflected light as long as the distal end of shaft 15 is located at the designed depth. However, during occurrences of excessive upthrust forces which cause the impellers and shaft 15 connected thereto to be upwardly displaced, beam R will no longer be impinged by reflective elements 9. Receiver (s) 14 will therefore cease to receive the reflected light or receive less reflected light.

Both light emitter 8 and receiver(s) 14 comprise a water tight housing that can withstand the high temperature, e.g. 110-300° C., and high pressure of fluid found in a deep well such as a geothermal production well, e.g. 475 m below ground level. The housing may be made of reinforced glass or other transparent material which can withstand such temperatures to prevent optical distortions when the light is transmitted or received.

Figure 4:
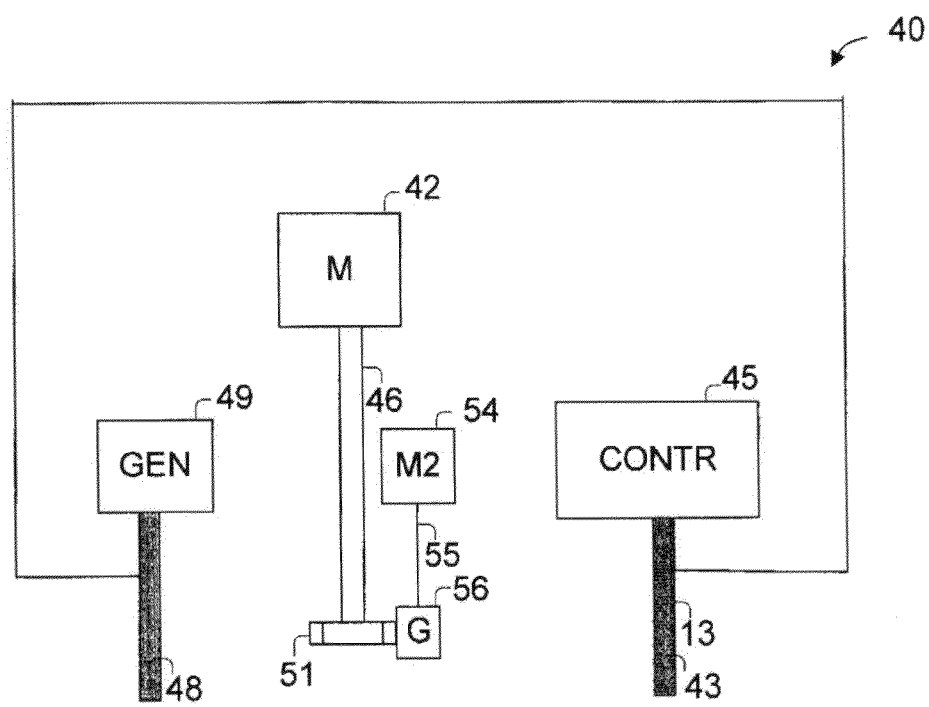
FIG. 4 is a schematic illustration of the head assembly of the pump of FIG. 2, showing additional components of the monitoring apparatus that are mounted therein.

FIG. 4 schematically illustrates the head assembly of the pump mounted at ground surface. Head assembly 40 comprises the motor 42 for driving head shaft 46, which is coupled to the line shaft, and a controller 45 for receiving a signal from one of the downhole receivers, which is indicative of whether reflected light is being received thereby. A cable 43, which is securely attached to the inner surface of outer portion 13, extends downwardly from controller 45 and may branch to each of the receivers. A second cable 48, which is also securely attached to the inner surface of outer portion 13, extends downwardly from generating unit 49 to the light emitter. Generating unit 49 may comprise a light generator such as a laser, e.g. an infrared laser, and second cable 48 may comprise one or more fiber optic cable which guide the generated light to the emitter. Alternatively, the light generator, e.g. a light emitting diode, may be housed in the light emitter, and generating unit 49 may comprise a modulator for generating the control signals needed to power the light generator. In such an embodiment, second cable 48 comprises a plurality of electrical conductors by which the control signals are transmitted. First cable 43 and second cable 48 may be encased by a tube which is secured to the inner surface of outer portion 13.

Figure 5:
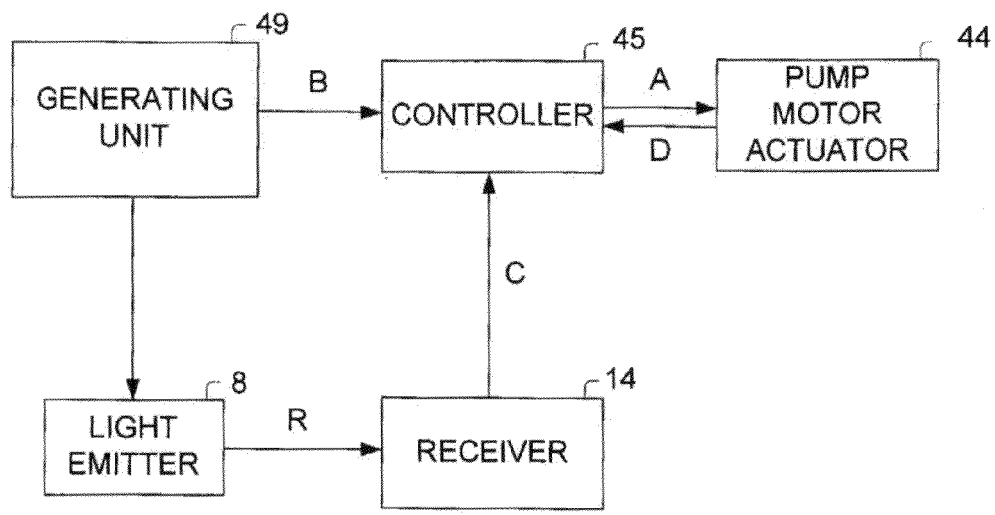
FIG. 5 is a block diagram which illustrates the operation of the monitoring apparatus of the pump of FIG. 2 according to one embodiment of the invention.

As shown in FIG. 5, the monitoring apparatus will usually operate only during rotation of the pump shaft. Controller 45 may receive an input from pump motor actuator 44 as to whether the pump motor is in operation, and transmit a control signal B to commence the operation of generating unit 49 a predetermined period of time following receiving a signal A from actuator 44 that is indicative that the pump motor has been activated. Following operation of generating unit 49, receiver(s) 14 will receive light R from light emitter 8 and transmit a signal C to controller 45 that is indicative that light is continuing to be received.

When controller 45 ceases to receive signal C, a control signal D may be transmitted to actuator 44 by which deactivation of the pump motor is initiated, in order to prevent damage to the impellers, or any other rotating parts, as a result of the upthrust forces.

Referring back to FIG. 4, adjusting nut 51 fitted on head shaft 46 may be used to axially position the distal end of the line shaft downwardly after the controller determines that the line shaft and impellers have been displaced upwardly. When the pump motor is deactivated and head shaft 46 is not rotating, adjusting nut 51 may be manually manipulated to force head shaft 46, as well as the line shaft and impellers, downwardly. The generating unit may then be activated or operated, such as by overriding the restriction for operating the monitoring apparatus only during activation of the pump motor, to determine whether the line shaft is properly aligned and the emitted light beam impinges a reflective element.

Alternatively, a secondary motor 54 mounted in head assembly 40 is used to rotate adjusting nut 51. Output shaft of secondary motor 54 drives a reduction gear mechanism 56, which in turn is connected to adjusting nut. Upon operation of secondary motor 54, adjusting nut 51 is rotated until the distal end of the line shaft is properly aligned.

Figure 6:
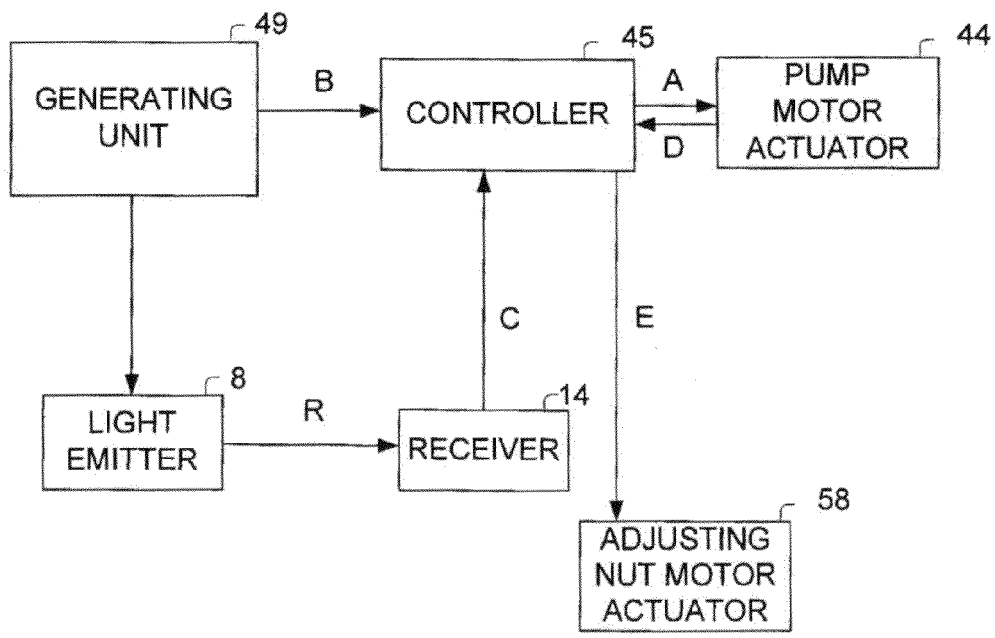
FIG. 6 is a block diagram which illustrates the operation of the monitoring apparatus of the pump of FIG. 2 according to another embodiment of the invention.

As shown in FIG. 6, controller 45 may be operated to control operation of the secondary motor, in addition to the operations described with relation to FIG. 5. After a predetermined period of time following transmission of deactivation signal D to pump motor actuator 44 as a result of not receiving a signal C from receiver 14, controller 45 transmits an activation signal E to adjusting nut motor actuator 58. The adjusting nut motor is operated for a sufficient period of time to allow the distal end of the line shaft to be properly aligned, proper alignment being determined by means of the monitoring apparatus.

Figure 7:
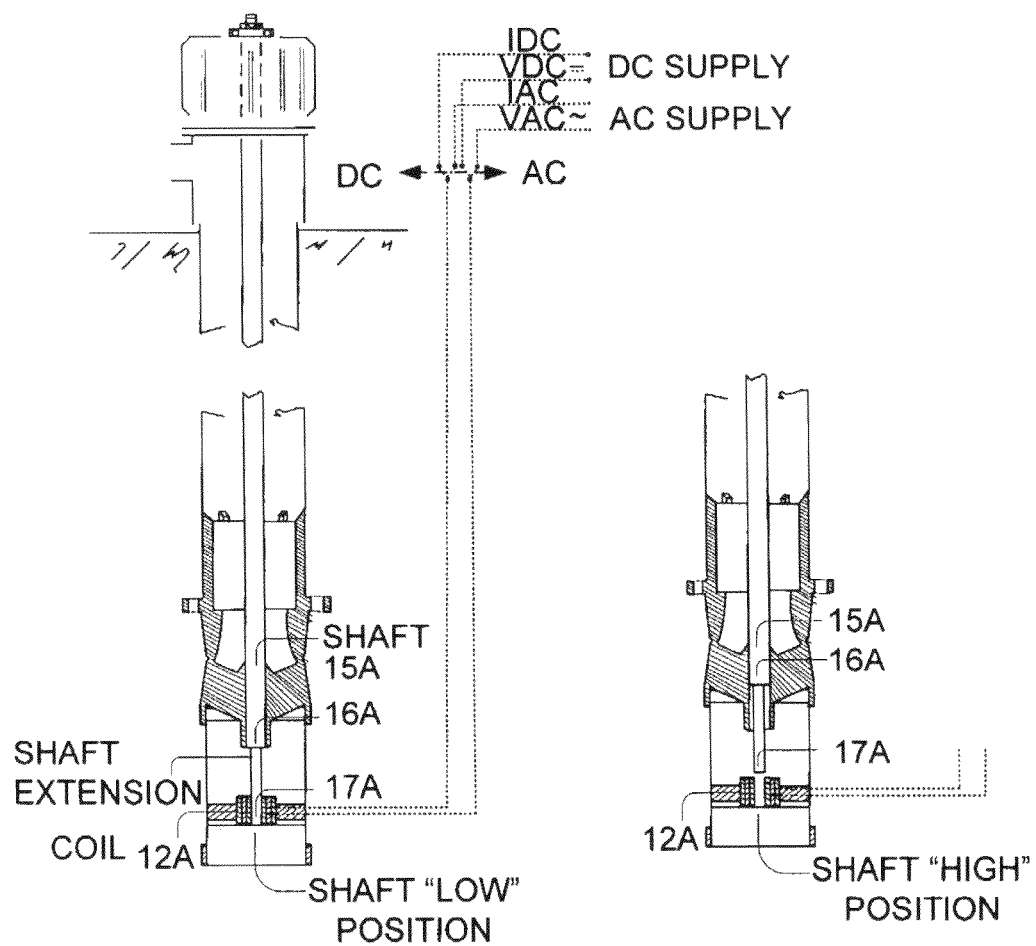
FIG. 7 is an illustration showing a vertical cross sectional view of a portion of a downhole pump, showing apparatus for preventing damage to a downhole pump impeller, according to another embodiment of the invention.

In another embodiment of the invention described with reference to FIG. 7, monitoring apparatus designated 10A comprises coil 12A with variable core 17A attached to distal end 16A of line shaft 15A and coil 12A attached to the inner surface of the pump outer portion. An electromagnetic field with a characteristic frequency is applied to the coil. The electric current will change if the impeller is vertically displaced, causing a change in the inductivity of coil 12A. Advantageously, the alternating current power supply can be switched with a direct current power supply in to order to compensate for ohmic resistance changes due to the ambient temperature and the well-bore temperature.

In another embodiment of the invention, the monitoring apparatus comprises a variable nozzle device provided with the distal end of the line shaft. Oil is injected through the variable nozzle device, and the oil pressure is monitored. A substantial change in oil pressure is indicative that the line shaft has been upwardly displaced.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A method for maintaining a downhole pump impeller of a geothermal downhole pump in a geothermal production well, comprising the steps of:
    locating a line shaft of the downhole pump to a selected depth in the geothermal production well, wherein a coil and a variable core are attached to the distal end of the line shaft,
    monitoring the depth of a lowermost distal end of said line shaft in the geothermal production well using a monitor positioned at a lowermost distal end of said line shaft in order to prevent damage to said impeller,
    determining that the depth of the lowermost distal end of said line shaft has significantly changed, and
    taking a corrective action to return the depth of the lowermost distal end of said line shaft to said selected depth in order to maintain and prevent damage to said impeller.

2. The method according to claim 1, wherein the depth of the line shaft distal end is monitored by directing a beam of light emitted from a housing mounted on a outer portion of the downhole pump onto a plurality of reflective elements located on the line shaft distal end, and determining whether a receiver mounted in said outer portion receives light reflected from said one plurality of reflective elements.

3. The method according to claim 2, wherein the receiver transmits a correct depth indication signal to a controller upon receiving the reflected light.

4. The method according to claim 3, wherein the controller transmits a deactivation command signal to a motor actuator of the downhole pump if the correct depth indication signal has not been received for a predetermined period of time.

5. The method according to claim 1, wherein the corrective action is performed by vertically displacing the line shaft distal end when the line shaft is non-rotating until a correct depth indication signal is transmitted.

6. The method according to claim 1, wherein the line shaft distal end is vertically displaced by manipulating an adjusting nut fitted on a head shaft which is coupled with the line shaft.

7. The method according to claim 6, wherein the adjusting nut is manipulated by operating a secondary motor for driving a reduction gear mechanism which is connected to the adjusting nut.

8. The method according to claim 7, wherein the controller sends a signal to operate the secondary motor if the correct depth indication signal has not been received for a predetermined period of time.

9. The method according to claim 1 wherein said coil is attached to an inner surface of a pump outer portion and the depth of said line shaft lowermost distal end is monitored by applying an electromagnetic field to said coil such that the change in the electric current in said coil and the inductivity of said coil indicates a change or displacement of the vertical position of the impeller of the pump.

* * * * *